US012629902B2

(12) United States Patent
Kani

(10) Patent No.: US 12,629,902 B2
(45) Date of Patent: May 19, 2026

(54) PROCESSING APPARATUS FOR COMPOSITE MATERIAL AND PROCESSING METHOD FOR COMPOSITE MATERIAL

(71) Applicant: MITSUBISHI HEAVY INDUSTRIES, LTD., Tokyo (JP)

(72) Inventor: Yuki Kani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 105 days.

(21) Appl. No.: 17/882,983

(22) Filed: Aug. 8, 2022

(65) Prior Publication Data

US 2023/0056597 A1    Feb. 23, 2023

(30) Foreign Application Priority Data

Aug. 18, 2021    (JP) ................................. 2021-133177

(51) Int. Cl.
B29C 70/46        (2006.01)
B29C 70/18        (2006.01)
(Continued)

(52) U.S. Cl.
CPC .............. B29C 70/46 (2013.01); B29C 70/18 (2013.01); B29C 70/541 (2013.01);
(Continued)

(58) Field of Classification Search
CPC ............................... B29C 70/46; B29C 70/541
See application file for complete search history.

(56) References Cited

U.S. PATENT DOCUMENTS 4,378,265 A * 3/1983 Kiss .......................... B27N 5/00
                                                                        264/119
5,026,514 A * 6/1991 Hauwiller .......... B29D 99/0003
                                                                        264/258
(Continued)

FOREIGN PATENT DOCUMENTS

DE        102012010469 A1    11/2013
JP            5826243 B2    12/2015
(Continued)

OTHER PUBLICATIONS

Japan Patent Office, "Office Action for Japanese Patent Application 2021-133177," Nov. 1, 2022.
(Continued)

*Primary Examiner* — Andrew D Graham
(74) *Attorney, Agent, or Firm* — HAUPTMAN HAM, LLP

(57)        ABSTRACT

An object of the disclosure is to improve the quality of a molded component after processed. A processing apparatus 10 is the processing apparatus 10 for a composite material 1 in which fibers and a thermoplastic resin are compounded. The processing apparatus 10 includes: a pair of pallets 20 configured to clamp the composite material 1; a heating die 30 configured to press and heat the composite material 1 via the pair of pallets 20; a cooling die 40 configured to press and cool the composite material 1 via the pair of pallets 20; a temperature adjustment unit configured to adjust a temperature of the cooling die 40; and a conveyance device 50 configured to convey the pair of pallets 20 clamping the composite material 1 from the heating die 30 to the cooling die 40.

1 Claim, 10 Drawing Sheets

(51) Int. Cl.

| | | |
|---|---|---|
| *B29C 70/54* | (2006.01) | |
| *B29K 101/12* | (2006.01) | |
| *B29K 105/08* | (2006.01) | |
| *B29K 307/04* | (2006.01) | |
| *B29L 31/30* | (2006.01) | |

(52) U.S. Cl.
CPC .. *B29K 2101/12* (2013.01); *B29K 2105/0863* (2013.01); *B29K 2307/04* (2013.01); *B29L 2031/3076* (2013.01)

(56) References Cited

U.S. PATENT DOCUMENTS

| | | | | |
|---|---|---|---|---|
| 2007/0270030 A1* | 11/2007 | Ito | H01J 61/523 |
| | | | 439/541.5 |
| 2008/0261046 A1* | 10/2008 | Husler | B29C 70/44 |
| | | | 425/405.2 |
| 2009/0065977 A1* | 3/2009 | Suzuki | B29C 70/50 |
| | | | 425/383 |
| 2010/0215887 A1 | 8/2010 | Kawabe | |
| 2012/0270009 A1 | 10/2012 | Kawabe | |
| 2012/0270030 A1* | 10/2012 | Kawabe | B29C 70/504 |
| | | | 156/60 |
| 2013/0097849 A1* | 4/2013 | Bergmann | B23P 23/00 |
| | | | 29/527.1 |
| 2013/0193611 A1* | 8/2013 | Polk, Jr. | B29C 39/10 |
| | | | 264/259 |
| 2015/0123309 A1* | 5/2015 | Rotter | B29C 70/44 |
| | | | 425/403.1 |
| 2015/0129118 A1* | 5/2015 | Hickman | B29C 70/46 |
| | | | 156/221 |
| 2015/0298404 A1* | 10/2015 | Kondo | B32B 37/10 |
| | | | 156/196 |
| 2015/0375444 A1* | 12/2015 | Bamford | B29C 43/52 |
| | | | 425/398 |
| 2016/0361893 A1* | 12/2016 | Hitomi | B29C 48/0022 |
| 2017/0015055 A1* | 1/2017 | Hufenbach | B29C 35/0266 |
| 2018/0079111 A1* | 3/2018 | Gordin | B29C 43/36 |
| 2018/0162074 A1* | 6/2018 | Takano | B29C 43/3642 |
| 2021/0154952 A1* | 5/2021 | Takebe | B29C 43/58 |
| 2021/0394405 A1* | 12/2021 | Erceg | B29C 33/308 |

FOREIGN PATENT DOCUMENTS

| | | |
|---|---|---|
| JP | 2017-518904 A | 7/2017 |
| KR | 10-2019-0029893 A | 3/2019 |

OTHER PUBLICATIONS

European Patent Office Extended Search Report with Search Opinion for European Patent Application No. 22190522.7 Jan. 2, 2023.

* cited by examiner

40

PROCESSING APPARATUS FOR COMPOSITE MATERIAL AND PROCESSING METHOD FOR COMPOSITE MATERIAL

CROSS-REFERENCE TO RELATED APPLICATIONS

This application claims the benefit of priority to Japanese Patent Application Number 2021-133177 filed on Aug. 18, 2021. The entire contents of the above-identified application are hereby incorporated by reference.

BACKGROUND

1. Technical Field

The present disclosure relates to a processing apparatus for a composite material and a processing method for a composite material.

2. Description of Related Art

Composite materials, for example, a thermoplastic carbon fiber reinforced plastic (CFRP) may be used for aircraft components such as a fuselage and a main wing of an aircraft. One known method for processing such a thermoplastic composite material into a desired shape is to press the composite material by using a die or the like to deform the composite material and then gradually reduce the temperature of the die or the like while maintaining the pressing state to solidify the composite material (for example, Japanese Patent No. 5826243).

Japanese Patent No. 5826243 discloses a press molding die used for press-molding a composite material made by a combination of reinforcing material fibers such as carbon fiber fabrics and a resin material such as a thermoplastic resin or a thermosetting resin. Such a press molding die has a movable die that moves vertically, a fixed die, and an inter-die piece arranged between the movable die and the fixed die. Further, the fixed die and the movable die are provided with a cooling passage through which a cooling medium flows. Further, the inter-die piece is provided with an electric heater.

Japanese Patent No. 5826243 is an example of the related art.

BRIEF SUMMARY

However, the apparatus disclosed in Japanese Patent No. 5826243 performs heating and cooling of a component being molded (composite material) by using a single set of dies (the fixed die and the movable die). Accordingly, in a cooling step after a heating step, the die at a high temperature is cooled by a cooling medium flowing through a cooling passage, and the temperature will thus be unevenly distributed in the die due to the arrangement of the cooling passage or the like. In detail, for example, the temperature of a part near the cooling passage easily falls and is lower than that of the remaining region, while the temperature of a part distant from the cooling passage does not easily fall and is higher than that of the remaining region. If the temperature becomes unevenly distributed in the die, the temperature of the composite material to which the temperature of the die is transferred will also be unevenly distributed. Accordingly, the progress of solidification of the composite material is uneven in different places, which results in occurrence of a solidified part and a part which has not yet been solidified (hereafter, referred to as "unsolidified part") in the composite material. If a solidified part occurs in a part of the composite material, the solidified part will support the die, and will inhibit application of a pressure to the unsolidified part. This may cause insufficient pressurization or a contact failure between the composite material and the die in the unsolidified part. Such insufficient pressurization and a contact failure between the composite material and the die may cause a void or the like and deteriorate the quality of a molded component after processed.

The present disclosure has been made in view of such circumstances, and an object of the present disclosure is to provide a processing apparatus for a composite material and a processing method for a composite material that can improve the quality of a molded component after processed.

To achieve the above object, a processing apparatus for a composite material and a processing method for a composite material of the present disclosure employ the following solutions.

The processing apparatus for a composite material according to one aspect of the present disclosure is a processing apparatus for a composite material in which fibers and a thermoplastic resin are compounded, and the processing apparatus includes: a pair of pallets configured to clamp the composite material; a heating die configured to press and heat the composite material via the pair of pallets; a cooling die configured to press and cool the composite material via the pair of pallets; a temperature adjustment unit configured to adjust a temperature of the cooling die; and a conveyance unit configured to convey the pair of pallets clamping the composite material from the heating die to the cooling die.

The processing method for a composite material according to one aspect of the present disclosure is a processing method for a composite material in which fibers and a thermoplastic resin are compounded, and the processing method includes: pressing and heating the composite material by a heating die via a pair of pallets clamping the composite material; pressing and cooling the composite material by a cooling die having a temperature adjustment unit via the pair of pallets; and conveying the pair of pallets clamping the composite material from the heating die to the cooling die.

According to the present disclosure, it is possible to improve the quality of a molded component after processed.

DETAILED DESCRIPTION

Figure 1:
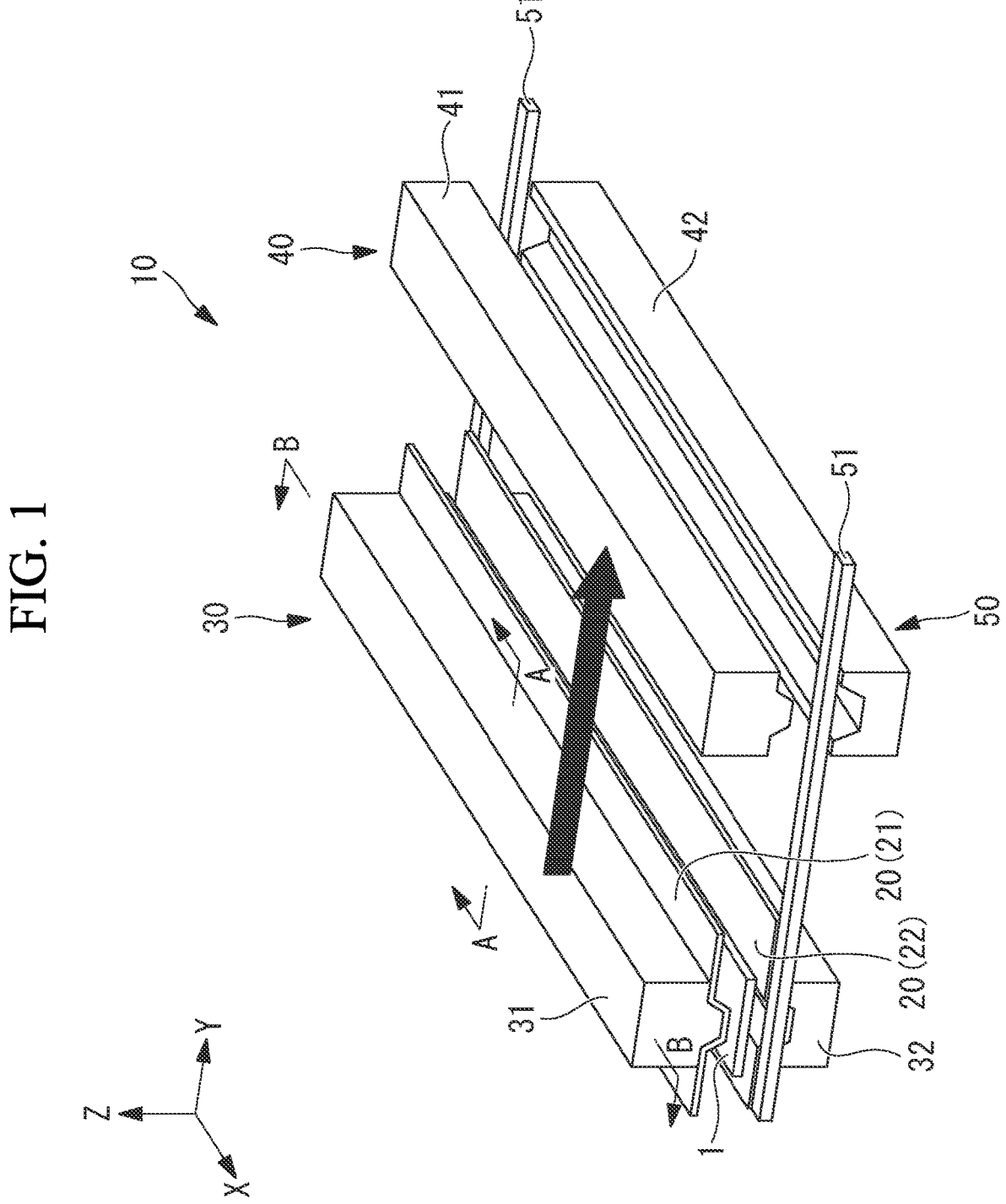
FIG. 1 is a perspective view illustrating a processing apparatus according to an embodiment of the present disclosure.

One embodiment of a processing apparatus for a composite material and a processing method for a composite material according to the present disclosure will be described below with reference to the drawings. In the drawings and the following description, a direction in which a heating die and a cooling die press a composite material is defined as a Z-axis direction, the longitudinal direction of the composite material and a molded component is defined as an X-axis direction, and a direction orthogonal to the Z-axis direction and the X-axis direction is defined as a Y-axis direction.

A processing apparatus 10 according to the present embodiment is an apparatus for molding a planar composite material 1 into a desired shape, and the planar composite material is a material used for manufacturing a stringer, a spar, a frame, a rib, and the like that are aircraft components forming an aircraft structure. An example of the composite material 1 may be a carbon fiber reinforced plastic (CFRP) in which a thermoplastic resin and carbon fibers are compounded, for example. Specifically, the composite material 1 may be a laminated body of multilayered fiber reinforced sheets in which fibers are impregnated with a resin. Note that the material of the composite material 1 may be any composite material in which fibers and a thermoplastic resin are compounded and is not limited to the composite material 1 described above.

Figure 2:
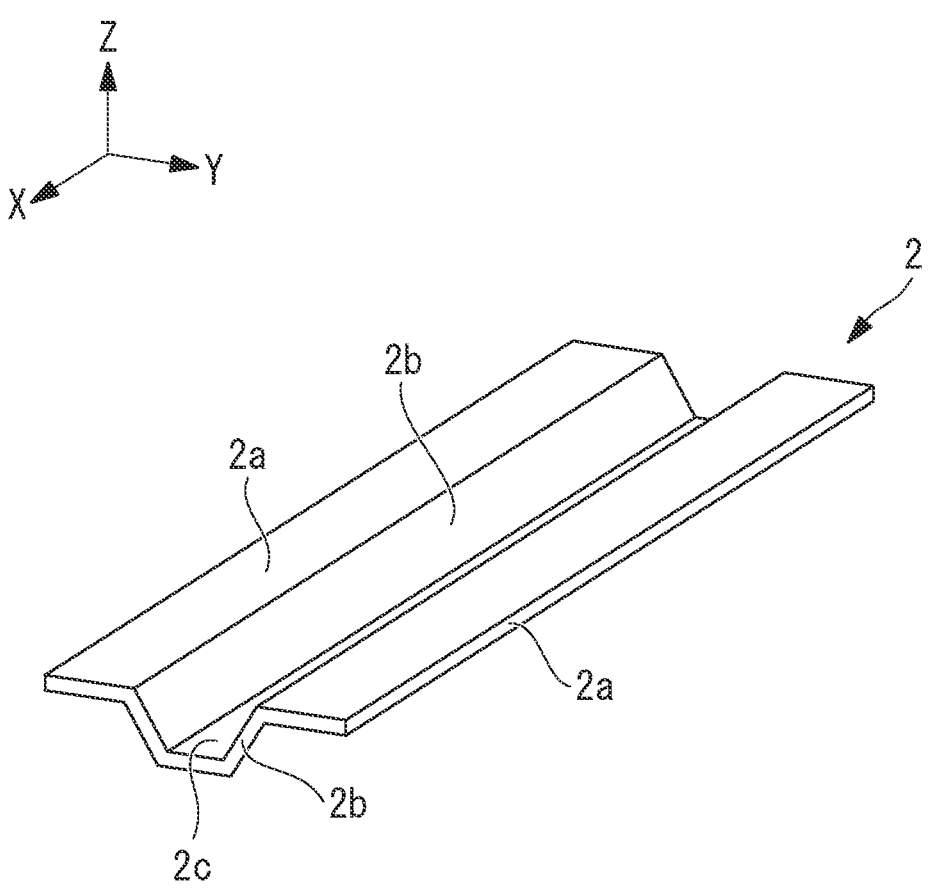
FIG. 2 is a perspective view illustrating a molded component according to the embodiment of the present disclosure.

As illustrated in FIG. 1, the processing apparatus 10 according to the present embodiment is an apparatus that processes a planar composite material 1 to manufacture a molded component 2 (see FIG. 2). The molded component 2 according to the present embodiment is a long member as illustrated in FIG. 2. The length in the X-axis direction of the molded component 2 is about 5 m to 10 m. The sectional shape of the molded component 2 when taken along a plane orthogonal to the X-axis direction is a hat shape. In detail, the molded component 2 includes a pair of flange parts 2a arranged at both ends in the Y-axis direction and extending in the X-axis direction and the Y-axis direction, a pair of web parts 2b extending at an angle inward from the inner end in the Y-axis direction of respective flange parts 2a, and a cap part 2c connecting the inner ends of the pair of web parts 2b to each other. In the molded component 2, the sectional shape when taken along a plane orthogonal to the X-axis direction is the same in the substantially entire region in the X-axis direction. Further, the molded component 2 has a plate thickness of about 2 mm to 3 mm. Note that the shape and the plate thickness of the molded component 2 are examples and are not limited thereto.

As illustrated in FIG. 1, the processing apparatus 10 according to the present embodiment includes a pair of pallets 20 that clamp the composite material 1, a heating die 30 that presses and heats the composite material 1 via the pair of pallets 20, a cooling die 40 that presses and cools the composite material 1 via the pair of pallets 20, and a conveyance device (a conveyance unit) 50 that conveys the pair of pallets 20 clamping the composite material 1 from the heating die 30 to the cooling die 40. The heating die 30 and the cooling die 40 are arranged adjacent to each other in the Y-axis direction.

Further, the processing apparatus 10 includes a heating die movement device (not illustrated) that moves the heating die 30 in the Z-axis direction and a cooling die movement device (not illustrated) that moves the cooling die 40 in the Z-axis direction.

Figure 3:
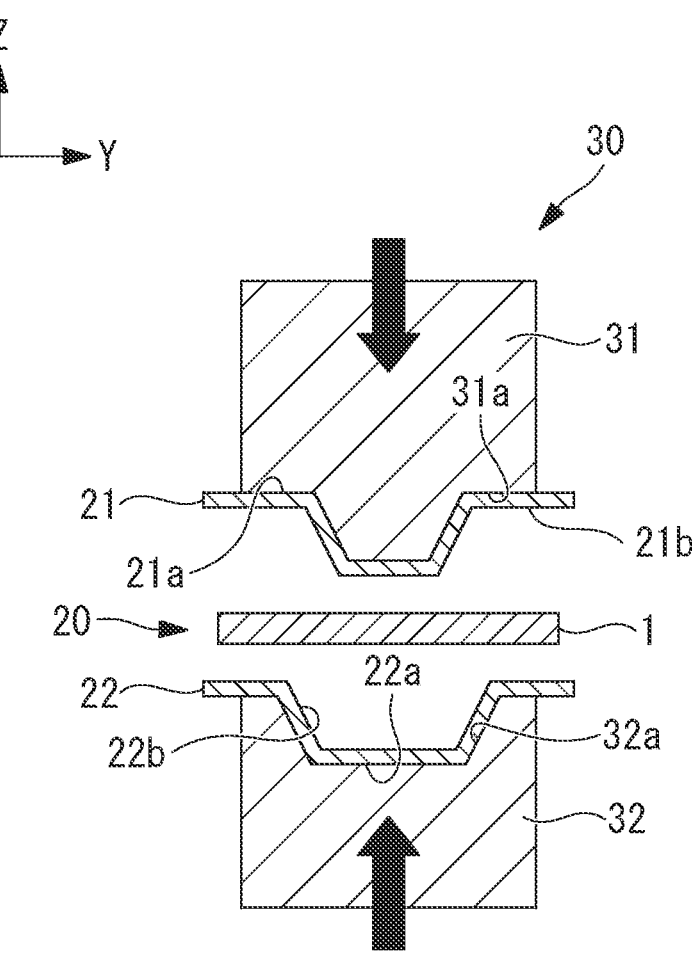
FIG. 3 is a sectional view illustrating a heating die according to the embodiment of the present disclosure, which is a sectional view taken along the arrow A-A of FIG. 1.
Figure 4:
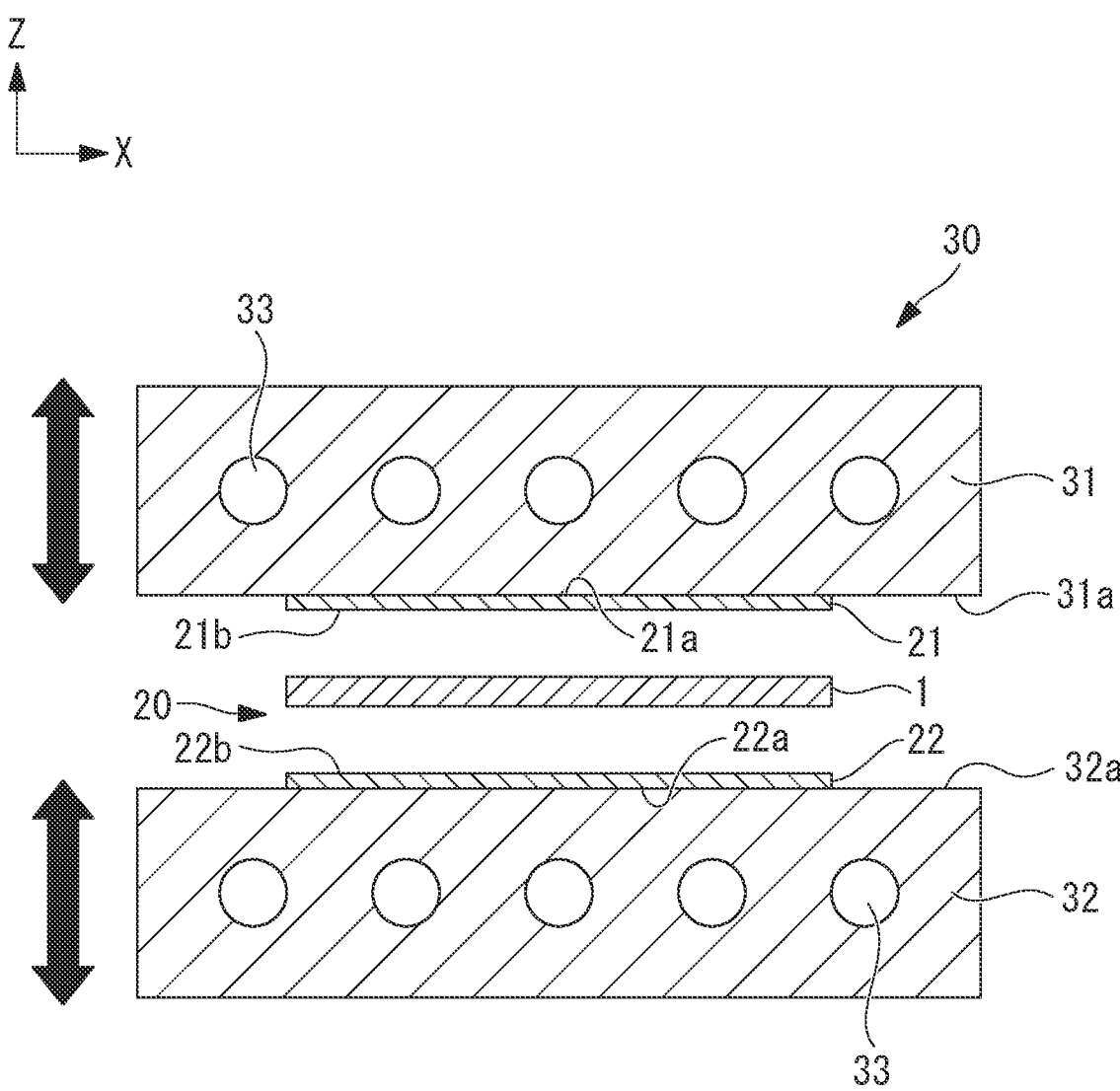
FIG. 4 is a sectional view illustrating a heating die according to the embodiment of the present disclosure, which is a sectional view taken along the arrow B-B of FIG. 1.

As illustrated in FIG. 3 and FIG. 4, the heating die 30 includes a first heating die 31 arranged on one side in the pressing direction (Z-axis direction) of the composite material 1 and a second heating die 32 arranged on the other side in the pressing direction of the composite material 1. The first heating die 31 and the second heating die 32 are arranged so as to clamp the composite material 1. Note that FIG. 3 and FIG. 4 illustrate a state before the heating die 30 presses the composite material 1.

As illustrated in FIG. 3, the first heating die 31 protrudes downward at the substantially center part in the Y-axis direction of a pressing surface 31a that presses the composite material 1. This protruding portion molds the web parts 2b and the cap part 2c of the molded component 2. Further, both the ends in the Y-axis direction of the pressing surface 31a are planar. These planar parts mold the flange parts 2a of the molded component 2.

The second heating die 32 is recessed downward at the substantially center part in the Y-axis direction of a pressing surface 32a that presses the composite material 1. This recessed portion molds the web parts 2b and the cap part 2c of the molded component 2. Further, both the ends in the Y-axis direction of the pressing surface 32a are planar. These planar parts mold the flange parts 2a of the molded component 2.

As illustrated in FIG. 4, a plurality of heating die heaters 33 are provided inside the first heating die 31 and the second heating die 32. The heating die heaters 33 generate heat and thereby heat the first heating die 31 and the second heating die 32. Each heating die heater 33 extends in the Y-axis direction. The plurality of heating die heaters 33 are aligned at predetermined intervals along the X-axis direction.

The heating die movement device moves the first heating die 31 and the second heating die 32 in the Z-axis direction to come close to each other as illustrated in the arrows of FIG. 3. Thus, the heating die movement device moves the first heating die 31 and the second heating die 32 so that the first heating die 31 and the second heating die 32 press the composite material 1. The composite material 1 is pressed and deformed between the first heating die 31 and the second heating die 32 by drive force of the heating die movement device. Note that the heating die movement device may move any one of the first heating die 31 and the second heating die 32 to be closer to the other.

Figure 7:
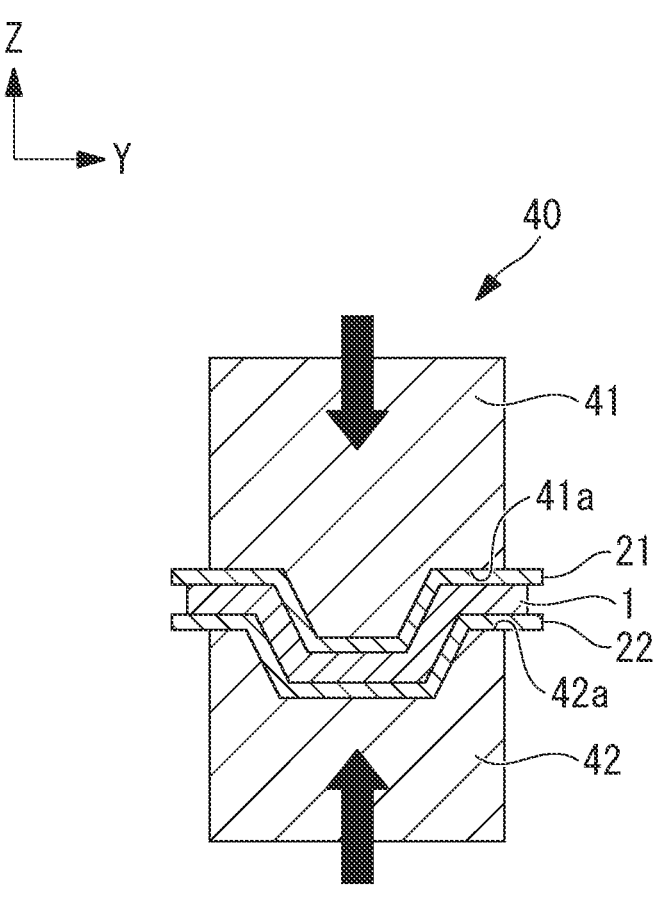
FIG. 7 is a schematic longitudinal sectional view illustrating a cooling die according to the embodiment of the present disclosure and illustrates a state where the pallets and the composite material are pressed.
Figure 8:
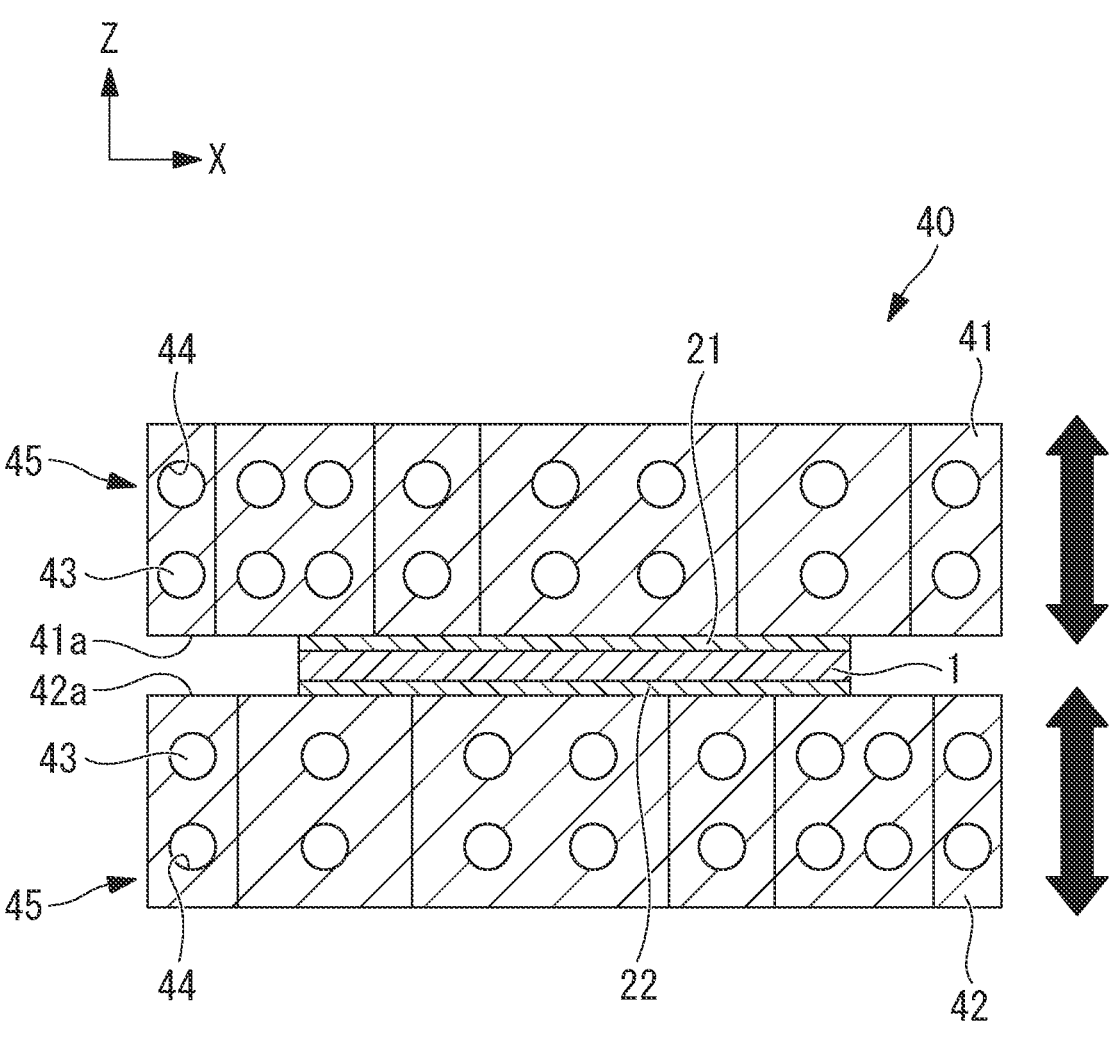
FIG. 8 is a schematic longitudinal sectional view illustrating the cooling die according to the embodiment of the present disclosure and illustrates a state where the pallets and the composite material are pressed.

As illustrated in FIG. 1, the cooling die 40 is arranged side by side at a predetermined spacing in the Y-axis direction to the heating die 30. As illustrated in FIG. 7 and FIG. 8, the cooling die 40 includes a first cooling die 41 arranged on one side in the pressing direction (Z-axis direction) of the composite material 1 and a second cooling die 42 arranged on the other side in the pressing direction of the composite material 1. The first cooling die 41 and the second cooling die 42 are arranged so as to clamp the composite material 1. Note that FIG. 7 and FIG. 8 illustrate a state when the cooling die 40 presses the composite material 1.

As illustrated in FIG. 7, the first cooling die 41 protrudes downward at the substantially center part in the Y-axis direction of a pressing surface 41a that presses the composite material 1. This protruding portion molds the web parts 2b and the cap part 2c of the molded component 2. Further, both the ends in the Y-axis direction of the pressing surface 41a are planar. These planar parts mold the flange parts 2a of the molded component 2. The pressing surface 41a of the first cooling die 41 has substantially the same shape as the pressing surface 31a of the first heating die 31 (see FIG. 5).

The second cooling die 42 is recessed downward at the substantially center part in the Y-axis direction of a pressing surface 42a that presses the composite material 1. This recessed portion molds the web parts 2b and the cap part 2c of the molded component 2. Further, both the ends in the Y-axis direction of the pressing surface 42a are planar. These planar parts mold the flange parts 2a of the molded component 2. The pressing surface 42a of the second cooling die 42 has substantially the same shape as the pressing surface 32a of the second heating die 32 (see FIG. 5).

As illustrated in FIG. 8, a temperature adjustment unit 45 is provided inside each of the first cooling die 41 and the second cooling die 42. The temperature adjustment unit 45 includes a plurality of cooling die heaters 43 and cooling medium pipes 44. The cooling die heaters 43 generate heat and thereby heat the first cooling die 41 and the second cooling die 42. Each cooling die heater 43 extends in the Y-axis direction. The plurality of cooling die heaters 43 are aligned at predetermined intervals (unequal intervals) in the X-axis direction. A cooling medium (for example, water) flows in the cooling medium pipes 44. The cooling medium pipes 44 exchange heat between the cooling medium flowing therein and the first cooling die 41 and the second cooling die 42 to cool the first cooling die 41 and the second cooling die 42. Each cooling medium pipe 44 extends in the Y-axis direction. The plurality of cooling medium pipes 44 are aligned at predetermined intervals (unequal intervals) in the X-axis direction. The plurality of cooling die heaters 43 are arranged on the pressing surfaces 41a and 42a side with respect to the plurality of cooling medium pipes 44. The temperature adjustment unit 45 can adjust the temperature of the cooling die 40 by adjusting the output of the cooling die heaters 43 or the flow rate of the cooling medium flowing in the cooling medium pipes 44. Note that the arrangement of the cooling die heaters 43 and the cooling medium pipes 44 is not limited to the arrangement described above. For example, the plurality of cooling medium pipes 44 may be arranged on the pressing surfaces 41a and 42a side with respect to the plurality of cooling die heaters 43.

The cooling die movement device moves the first cooling die 41 and the second cooling die 42 in the Z-axis direction so as to come close to each other as illustrated in the arrows of FIG. 7. Thus, the cooling die movement device moves the first cooling die 41 and the second cooling die 42 so that the first cooling die 41 and the second cooling die 42 press the composite material 1. The composite material 1 is pressed between the first cooling die 41 and the second cooling die 42 by drive force of the cooling die movement device. Note that the cooling die movement device may move any one of the first cooling die 41 and the second cooling die 42 to be closer to the other.

The pallet 20 is formed of a metal material having high rigidity and high thermal conductivity (for example, stainless). The lengths in the X-axis direction and the Y-axis direction of the pallet 20 are longer than the lengths in X-axis direction and the Y-axis direction of the composite material 1 (the molded component 2). Further, as illustrated in FIG. 3 and FIG. 4, the pair of pallets 20 have a first pallet 21 provided between the pressing surface 31a of the first heating die 31 and the composite material 1 and a second pallet 22 provided between the pressing surface 32a of the second heating die 32 and the composite material 1. The composite material 1 is provided between the first pallet 21 and the second pallet 22. The first pallet 21 and the second pallet 22 of the present embodiment each have the same plate thickness in the entire region in the X-axis direction and the Y-axis direction.

Figure 5:
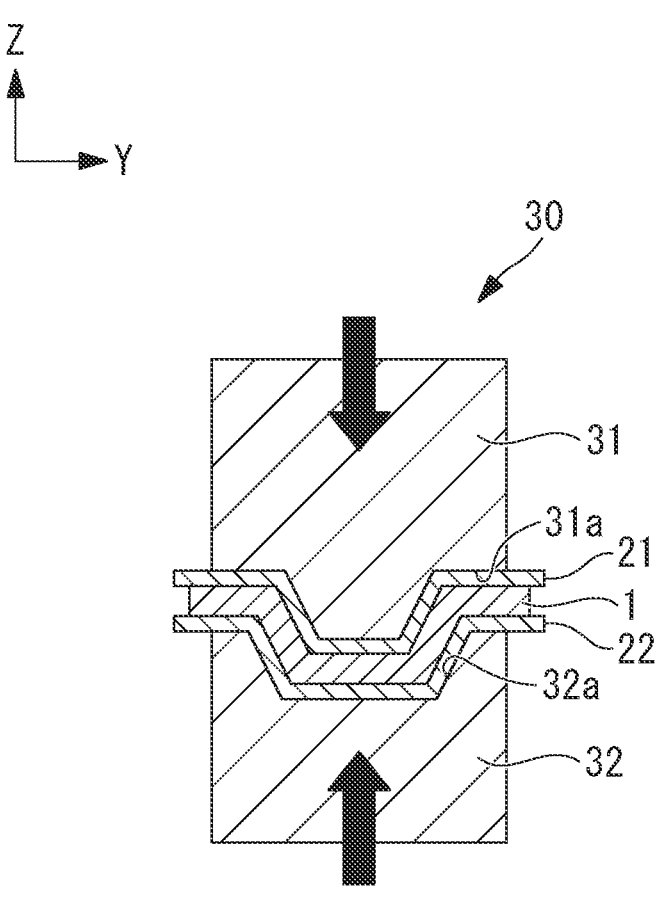
FIG. 5 is a sectional view illustrating the heating die according to the embodiment of the present disclosure and illustrates a state where pallets and a composite material are pressed.

As illustrated in FIG. 5, the first pallet 21 has a die contact surface 21a that comes into contact with the pressing surface 31a of the first heating die 31 and a composite material contact surface 21b that comes into contact with the composite material 1. When conveyed to the cooling die 40, the die contact surface 21a comes into contact with the pressing surface 41a of the first cooling die 41 (see FIG. 7).

The first pallet 21 has a shape corresponding to the shapes of the pressing surface 31a of the first heating die 31 and the pressing surface 41a of the first cooling die 41. Thus, the first pallet 21 protrudes downward at the substantially center part in the Y-axis direction so as to correspond to the protruding portions provided in the pressing surface 31a of the first heating die 31 and the pressing surface 41a of the first cooling die 41. These protruding portions mold the web parts 2b and the cap part 2c of the molded component 2. Further, the first pallet 21 is planar at both ends in the Y-axis direction so as to correspond to the planar portions provided in the pressing surface 31a of the first heating die 31 and the pressing surface 41a of the first cooling die 41. These planar portions mold the flange parts 2a of the molded component 2.

As illustrated in FIG. 5, the second pallet 22 has a die contact surface 22a that comes into contact with the pressing surface 32a of the second heating die 32 and a composite material contact surface 22b that comes into contact with the composite material 1. When conveyed to the cooling die 40, the die contact surface 22a comes into contact with the pressing surface 42a of the second cooling die 42 (see FIG. 7).

The second pallet 22 has a shape corresponding to the shapes of the pressing surface 32a of the second heating die 32 and the pressing surface 42a of the second cooling die 42. Thus, the second pallet 22 protrudes downward at the substantially center part in the Y-axis direction so as to correspond to the protruding portions provided in the pressing surface 32a of the second heating die 32 and the pressing surface 42a of the second cooling die 42. These protruding portions mold the web parts 2b and the cap part 2c of the molded component 2. Further, the second pallet 22 is planar at both ends in the Y-axis direction so as to correspond to the planar portions provided in the pressing surface 32a of the second heating die 32 and the pressing surface 42a of the second cooling die 42. These planar portions mold the flange parts 2a of the molded component 2.

Figure 6:
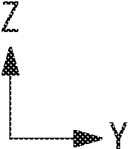
FIG. 6 is a longitudinal sectional view illustrating a state in a conveyance step of the pallets and the composite material according to the embodiment of the present disclosure.
Figure 6:
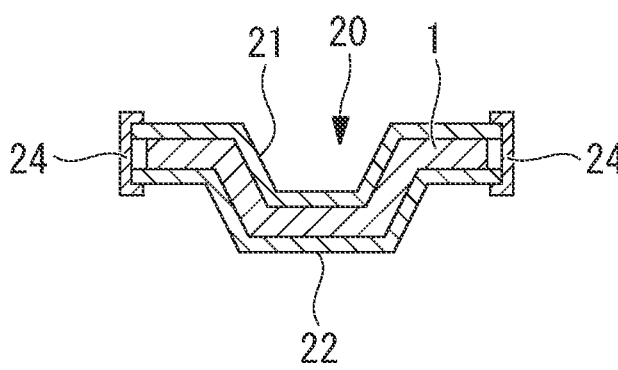

Further, as illustrated in FIG. 6, relative movement between the first pallet 21 and the second pallet 22 is restricted by brackets (a restriction part) 24 at least in the conveyance step. The bracket 24 is an automatic chuck mechanism (an automatic clamp mechanism) that clamps the first pallet 21 and the second pallet 22 to restrict the relative movement therebetween. For example, the brackets 24 are provided at both ends in the Y-axis direction of the first pallet 21 and the second pallet 22. The bracket 24 is detachably fixed to the first pallet 21 and the second pallet 22 to restrict the relative movement between the first pallet 21 and the second pallet 22. Note that the structure of the restriction part is not limited to the bracket 24 described above. The restriction part may be of any structure that restricts relative movement between the first pallet 21 and the second pallet 22.

As illustrated in FIG. 1, the conveyance device 50 includes a pair of rails 51 that connects the heating die 30 and the cooling die 40 to each other and a rail movement device (not illustrated) that moves the rails 51 in the Z-axis direction. Each rail 51 linearly extends in the Y-axis direction. In one of the rails 51, one end in the Y-axis direction (the left end in FIG. 1) is close to one end in the X-axis direction of the heating die 30 (in detail, the second heating die 32), and the other end in the Y-axis direction (the right end in FIG. 1) is close to one end in the X-axis direction of the cooling die 40 (in detail, the second cooling die 42). Further, in the other rail 51, one end in the Y-axis direction (the left end in FIG. 1) is close to the other end in the X-axis direction of the heating die 30 (in detail, the second heating die 32), and the other end in the Y-axis direction is close to the other end in the X-axis direction of the cooling die 40 (in detail, the second cooling die 42). Thus, the pair of rails 51 are arranged so as to interpose the heating die 30 and the cooling die 40. Further, the pair of rails 51 are arranged so as not to interfere with the heating die 30 and the cooling die 40. Accordingly, the pair of rails 51 are relatively movable in the Z-axis direction with respect to the heating die 30 and the cooling die 40. The ends in the X-axis direction of the pallet 20 are placed on the top face of the pair of rails 51.

Further, the conveyance device 50 includes a conveyance mechanism (not illustrated) that conveys the pair of pallets 20 along the rails 51. The conveyance mechanism is not particularly limited as long as it is a component that can convey the pair of pallets 20. For example, the rails 51 may be a belt conveyer. The pair of pallets 20 placed on the belt conveyer may be conveyed when the belt conveyer is revolved by drive force applied from a drive source. Further, the top face of the rail 51 may be a teethed rack, and the pair of pallets 20 may be conveyed when a pinion connected to the pallet 20 is engaged with the rack and rotated by drive force applied from a drive source.

Next, a method of processing the composite material 1 and manufacturing the molded component 2 by using the processing apparatus 10 or the like described above will be described.

[Composite Material Manufacturing Step]

First, a method of manufacturing a planar composite material 1 will be described.

First, a plurality of composite material base materials (for example, fiber reinforced sheets) are laminated to manufacture a planar laminated body. Next, the laminated body is set in a press machine (not illustrated). This press machine includes a heating mechanism (an electric heater or the like) that heats the laminated body and a cooling mechanism (a cooling medium pipe or the like) that cools the laminated body. Next, the press machine is activated to press and heat the laminated body. At this time, the laminated body is heated until the temperature of the laminated body rises above the melting point of the resin contained in the laminated body. Accordingly, the resin is melted and impregnated into fibers. Further, a gap between the base materials forming the laminated body is collapsed by the pressurization, and thereby the laminated body is deaired. Next, the cooling mechanism is activated to press and cool the laminated body. At this time, the laminated body is cooled until the temperature of the laminated body falls below the glass transition temperature of the resin contained in the laminated body. Accordingly, the resin is solidified. Next, the press machine is stopped, and the laminated body (composite material 1) is taken out. In such a way, the planar composite material 1 is manufactured.

Note that the method of manufacturing the planar composite material 1 is not limited to the method described above. For example, the planar composite material 1 may be manufactured by auto-clave molding.

Next, a method of processing the planar composite material 1 and manufacturing the molded component 2 by using the processing apparatus 10 will be described.

[Setting Step]

First, as illustrated in FIG. 3 and FIG. 4, the pair of pallets 20 are attached to the heating die 30. Next, the planar composite material 1 is set between the pair of pallets 20. At this time, the composite material 1 may be placed on the composite material contact surface 22b of the second pallet 22. Further, when the pair of pallets 20 are set in the heating die 30, the pallets 20 are set also on the rails 51.

Note that, before the composite material 1 is set, the heating die 30 and the pallets 20 may be heated to a predetermined temperature (a temperature above the melting point of the resin contained in the composite material 1) by the heating die heaters 33 provided to the heating die 30. This makes it possible to evenly heat the composite material 1.

[Pressing and Heating Step]

After the planar composite material 1 is set between the pair of pallets 20, the first heating die 31 and the second heating die 32 are then moved closer to each other by the heating die pressing device to press the composite material 1 as indicated by the arrows in FIG. 3 and FIG. 4. In such a way, the composite material 1 is pressed and heated via the pair of pallets 20, and thereby, as illustrated in FIG. 5, the composite material 1 is molded into a shape corresponding to the heating die 30 and the pallets 20. After the composite material 1 is pressed and heated for a predetermined time, the first heating die 31 and the second heating die 32 are moved away from each other by the heating die pressing device, and the pressurization of the composite material 1 is stopped. At this time, the pair of pallets 20 are maintained in a state of clamping the composite material 1.

[Conveyance Step]

Next, as illustrated in FIG. 6, the brackets 24 are attached to the pair of pallets 20. Next, the pair of pallets 20 clamping the composite material 1 are conveyed from the heating die 30 to the cooling die 40 by the conveyance device 50. In detail, the pallets 20 are conveyed to a position slightly above (for example, above by several centimeters) the pressing surface 42a of the second cooling die 42 along the rails 51 by the conveyance mechanism. Note that the height of the rails 51 may be adjusted in advance in accordance with the height position of the second cooling die 42 and the height position of the molded component 2. This can optimize the relative position in the Z-axis direction between the second cooling die 42 and the pallets 20. Therefore, the pallets 20 can be suitably interposed between the dies of the cooling die 40.

[Pressing and Cooling Step]

Before the pallets 20 are conveyed, the temperature of the entire cooling die 40 has been maintained at a predetermined temperature (the temperature below the solidification temperature of the resin contained in the composite material 1) by the temperature adjustment unit 45.

When the pair of pallets 20 clamping the composite material 1 are conveyed to the cooling die 40, then, as illustrated by the arrows in FIG. 7 and FIG. 8, the first cooling die 41 and the second cooling die 42 are moved closer to each other by the cooling die pressing device. At this time, the pallets 20 are located slightly above the second cooling die 42 and thus lifted by the second cooling die 42. The pallets 20 lifted by the second cooling die 42 are interposed between the first cooling die 41 and the second cooling die 42 and pressed in the vertical directions. In such a way, the composite material 1 clamped between the pair of pallets 20 is pressed. At this time, the brackets 24 are left attached to the pair of pallets 20. The composite material 1 is pressed and cooled via the pair of pallets 20 in such a way and thereby solidified. After the composite material 1 is pressed and cooled for a predetermined time, the first cooling die 41 and the second cooling die 42 are moved away from each other by the cooling die pressing device, and the pressurization of the composite material 1 is stopped.

[Taking-Out Step]

After the pressurization is stopped, the pair of pallets 20 clamping the composite material 1 are detached from the cooling die 40. Next, the brackets 24 attached to the pallets 20 are detached, and the pair of pallets 20 are detached from the composite material 1 (the molded component 2). Until the pair of pallets 20 are detached from the composite material 1 in this step, the pallets 20 and the composite material 1 are in close contact with each other. In such a way, the molded component 2 of a desired shape as illustrated in FIG. 2 is manufactured.

According to the present embodiment, the following effects and advantages are achieved.

The resin contained in the composite material 1 is heated by the heating die 30 and thereby melted. In the present embodiment, the pair of pallets 20 to clamp the composite material 1 are provided, and the composite material 1 is pressed and heated by the heating die 30 via the pair of pallets 20. Accordingly, the composite material 1 does not come into direct contact with the heating die 30. Therefore, when the composite material 1 is detached from the heating die 30, the melted resin is not attached to the surface of the heating die 30 (the pressing surfaces 31*a*, 32*a*). Thus, it is possible that a situation where the melted resin attaches to the heating die 30 and thereby the composite material 1 becomes out of shape is less likely to occur.

Further, as described above, since the resin contained in the composite material 1 is heated by the heating die 30 and thereby melted, it is difficult to convey only the composite material 1 heated by the heating die 30. The present embodiment includes the conveyance device 50 that conveys the pair of pallets 20 clamping the composite material 1 from the heating die 30 to the cooling die 40. As such, by conveying the composite material 1 in a state of being clamped by the pair of pallets 20, it is possible to easily convey the composite material 1 from the heating die 30 to the cooling die 40 without the composite material 1 being out of shape.

Further, by having the conveyance device 50 that easily conveys the composite material 1 to the heating die 30 and the cooling die 40, the heating die 30 and the cooling die 40 can be separate dies. Because the heating die 30 and the cooling die 40 are separate dies, in a state where the composite material 1 is not set, it is possible to reliably maintain the cooling die 40 at a desired temperature while reducing an uneven distribution of the temperature depending on the position by using the temperature adjustment unit 45. Accordingly, it is possible to convey the composite material 1 to the cooling die 40 in a state where the entire cooling die 40 is maintained substantially evenly at a predetermined temperature. It is therefore possible to reduce an uneven distribution of the temperature when cooling the composite material 1. Thus, the pressing force working on the composite material 1 can be evenly distributed. Thus, since occurrence of a void or the like can be decreased, the quality of the molded component 2 after processed can be improved.

Further, in the present embodiment, the heating die 30 and the cooling die 40 press the composite material 1 via the pair of pallets 20. Accordingly, it is possible to deform the composite material 1 into various shapes by changing the shape of the pallets 20. Thus, it is possible to deform the composite material 1 into various shapes by simply changing the shape of the composite material contact surfaces 21*b* and 22*b*. It is therefore possible to mold the composite material 1 into various shapes by using a single set of the heating die 30 and the cooling die 40. Thus, cost can be reduced compared to a case where different sets of dies are used for molding various shapes of the composite material 1.

Further, the present embodiment includes the brackets 24 that restrict relative movement between the pair of pallets 20. Accordingly, relative movement between the pair of pallets 20 can be restricted by the brackets 24 during conveyance from the heating die 30 to the cooling die 40 or the like. Accordingly, it is possible that the composite material 1 is less likely to be out of shape.

Further, as a method of processing the composite material 1 into a desired shape, one conceivable method is to process the composite material 1 by a so-called continuous molding method. However, the continuous molding method can be used only when manufacturing a molded component that is a long component whose sectional shape is constant in the longitudinal direction and thus is useless for molding a molded component having a complex shape. Further, since the component temperature differs on a position basis in the moving direction during the continuous molding, the viscosity or the amount of compression in solidification of the resin contained in composite materials also differs, and there is a problem of difficulty in controlling the amount of pressurization. Further, in the continuous molding method, since the moving direction of the composite material is limited to the longitudinal direction of the composite material, the length in the longitudinal direction of the processing apparatus is increased. This results in many constrains in the layout when a processing apparatus for continuous molding is installed.

On the other hand, in the present embodiment, the entire composite material 1 is heated and cooled while being pressed at once by the heating die 30 and the cooling die 40. Thus, since there is no need for performing complicated control of the amount of pressurization or the like, the working step can be simplified. Further, since any relative position of the heating die 30 and the cooling die 40 can be set, the flexibility in the layout when the processing apparatus 10 is installed can be improved.

Further, as a method of processing the composite material 1 into a desired shape, one conceivable method is to quickly convey a thermoplastic composite material heated above the melting point in advance by a heater, an oven, or the like to a die at a temperature at which solidification is easily facilitated, press and deform the composite material by the die, and solidified by the die as it stands.

In such a method, however, since the composite material is cooled while being deformed, the resin may be solidified before the resin is sufficiently impregnated into fibers during the deformation process. Thus, the composite material may be cooled during the deformation, and the composite material may be solidified in an incomplete state. Thus, a void or the like may occur in the processed molded component, and the quality may deteriorate. In particular, since this problem is notable in a large component or a complex shape component that requires time for overall impregnation of the resin, it is difficult to apply this method to such a large component or a complex shape component.

Further, the above method requires some action such as surrounding the conveying path by walls for heat insulation or conveying the composite material at a high speed, in order to prevent the composite material from being in contact with the atmospheric air and dissipating heat when conveying the composite material from the heater or the like to the die. This may make the facility complex or increase facility cost.

On the other hand, in the present embodiment, a deformation operation of the composite material 1 is not performed in the cooling die 40. Thus, the step of deforming the composite material 1 and the step of cooling the composite material 1 are separate steps. Accordingly, it is possible to cool the composite material 1 in the cooling step after adequately deforming the composite material 1 into a desired shape and while maintaining a state where the resin is sufficiently impregnated. It is therefore possible to prevent the composite material 1 from being solidified in an incomplete state in the step of deforming the composite material 1, and it is thus possible to improve the quality of the molded component 2 after processed.

Further, since both sides of the composite material 1 are in contact with the pallets 20 when conveyed from the heating die 30 to the cooling die 40, it may be possible to prevent the composite material 1 from being cooled by the atmospheric air. This can improve the molding quality. Further, since neither a facility for thermally insulating the conveying path nor high-speed conveyance is necessary, capability requirements for the facility can be relaxed. It is therefore possible to simplify the facility and reduce the cost.

Modified Example

Figure 9:
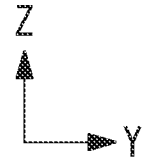
FIG. 9 is a schematic plan view illustrating a cooling die according to a modified example of the present disclosure.
Figure 9:
Figure 9:
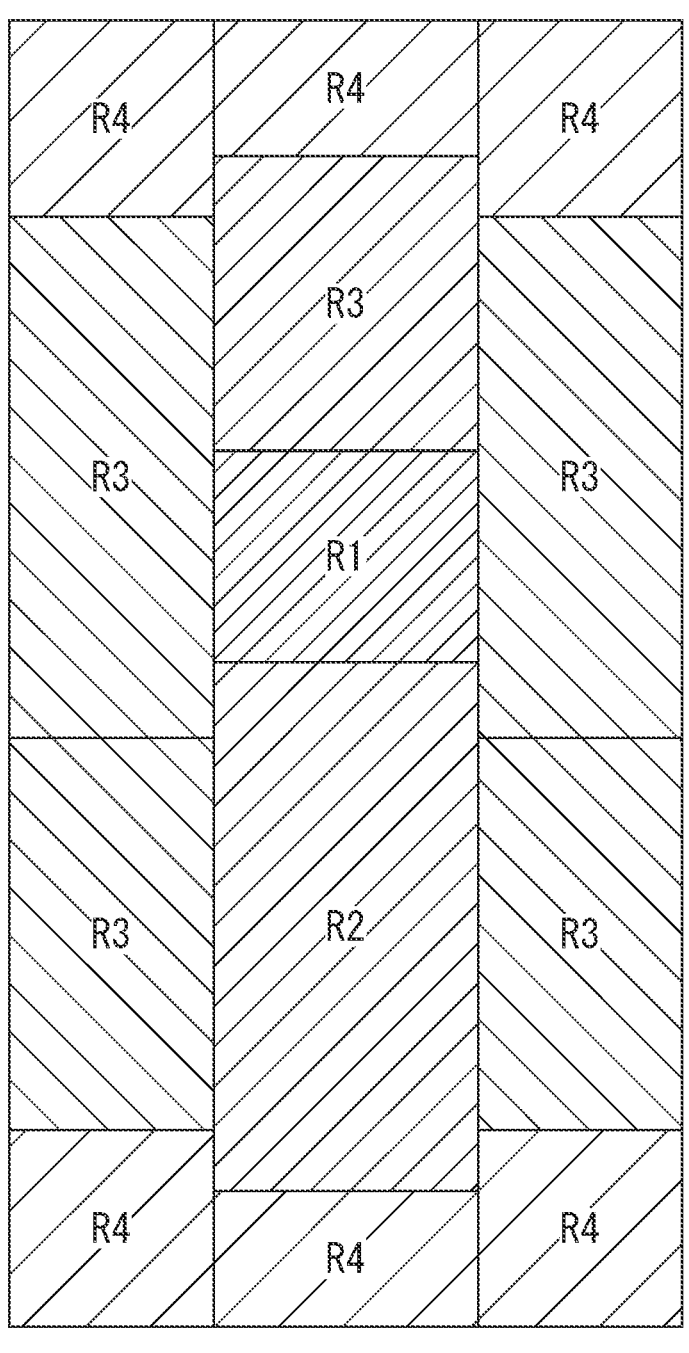

Next, a modified example of the present embodiment will be described with reference to FIG. 9. FIG. 9 is a schematic plan view of the cooling die 40.

In the present modified example, the shape of a molded component to be manufactured differs from the shape in the above embodiment. Specifically, in the molded component to be manufactured in the present modified example, the plate thickness in the substantially center region in the X-axis direction and the Y-axis direction is thicker than in the remaining region. Therefore, also for the shape of the composite material 1 before solidified, the plate thickness in the substantially center region (a first region) in the X-axis direction and the Y-axis direction is thicker than in the remaining region (a second region).

Further, the present modified example differs from the above embodiment in that the temperature of the cooling die 40 varies in accordance with positions. In the cooling die 40, the temperature of a portion R1 that comes into contact with a region of a thicker plate thickness of the composite material 1 is lower than the temperatures of portions R2, R3, and R4 that come into contact with the remaining region. The temperature of each portion is adjusted by the temperature adjustment unit 45 built in each portion. Thus, the temperature adjustment unit 45 adjusts the temperatures of the portion R1 and other portions in accordance with the shapes of the regions of the composite material 1 with which respective portions come into contact. In detail, the temperature adjustment unit 45 adjusts the temperatures of respective portions in accordance with the thicknesses of the regions of the composite material 1 with which respective portions come into contact. Since a thicker region of the composite material 1 requires relatively a longer time for heat transfer in the plate thickness direction inside the composite material 1 and thus is less likely to be solidified, the temperature of the portion with which such a region comes into contact is set lower.

Further, in the present modified example, in the cooling die 40, the temperature of the ends in the X-axis direction and the Y-axis direction is higher than the temperature of the center part in the X-axis direction and the Y-axis direction. The temperature of each portion is adjusted by the temperature adjustment unit 45 built in each portion. Thus, the temperature adjustment unit 45 adjusts the temperature of each portion at a temperature in accordance with the position of the cooling die 40. Specifically, the temperatures of the portions R3 and R4 located at the ends in the X-axis direction and the Y-axis direction are higher than the temperature of the portion R2 located at the center in the X-axis direction and the Y-axis direction. Further, in the present modified example, the temperature of the portion R4 located at the ends in the X-axis direction is higher than the temperature of the portion R3 located at the ends in the Y-axis direction.

Specifically, in the present modified example, the temperature of the portion R1 is 275° C., the temperature of the portion R2 is 280° C., the temperature of the portion R3 is 283° C., and the temperature of the portion R4 is 285° C.

According to the present modified example, the following effects and advantages are achieved.

In respective regions of the composite material 1, the rate of progress of solidification differs in accordance with the shape of the region. For example, the rate of progress of solidification is slower in the thicker region than in the thinner region if these regions are cooled at the same temperature. Further, the rate of progress of solidification changes in respective regions of the composite material 1 in accordance with the temperature of the cooling die 40 in contact. In detail, if regions of the same shape are cooled, the rate of progress of solidification is slower in a region at a high temperature of the cooling die 40 in contact than in a region at a low temperature of the cooling die 40 in contact.

In the present modified example, the temperature adjustment unit 45 adjusts respective temperatures of the portions R1 to R4 in accordance with the shapes (specifically, the thicknesses) of the regions of the composite material 1 with which the portions R1 to R4 come into contact. Accordingly, the solidification progress of each region of the composite material 1 can be adjusted to solidification progress in accordance with the shape of the region. Therefore, since the solidification progress can be made even over respective regions, the pressing force working on the composite material 1 can be evenly distributed. Thus, since occurrence of a void or the like can be decreased, the quality of the molded component after processed can be improved.

Further, in respective regions of the composite material 1, the rate of progress of solidification differs in accordance with the position of the region. For example, if all the temperatures of respective regions of the cooling die 40 are the same, a region located at the end of the composite material 1 is easily cooled by the ambient air, and therefore the rate of progress of solidification is faster in this region than in a region located at the center. Further, for respective regions of the composite material 1, the rate of progress of solidification varies in accordance with the temperature of the cooling die 40 in contact, as described above.

In the present modified example, the temperature adjustment unit 45 adjusts respective temperatures of the portions R1 to R4 in accordance with the position of the regions of the composite material 1 with which the portions R1 to R4 come into contact. Accordingly, the solidification progress of each region of the composite material 1 can be adjusted to solidification progress in accordance with the position of the region. Therefore, since the solidification progress can be made even over respective regions, the pressing force working on the composite material 1 can be evenly distributed. Thus, since occurrence of a void or the like can be decreased, the quality of the molded component after processed can be improved.

Note that the present disclosure is not limited to each embodiment described above, and modifications are possible as appropriate within the scope not departing from the spirit thereof.

For example, a step of preheating the planar composite material 1 by using a preheating device (for example, an infrared heater or the like) (not illustrated) may be provided before the step of heating and deforming the composite material 1 by using the heating die 30. When the composite material 1 is preheated, only the composite material 1 is heated without using the pallets 20. By heating the composite material 1 to some extent in advance in the preheating step, it is possible to heat the composite material 1 above the melting point (the melting point of the resin contained in the composite material 1) quickly and evenly in the pressing and heating step compared to a case of heating the composite material 1 from normal temperature (room temperature) by using the heating die 30.

Note that the composite material 1 may be heated above the melting point of the resin in the preheating step. In such a case, the heating time in the pressing and heating step can be significantly shortened or zero. Further, in the preheating step, the composite material 1 may be heated to a temperature that is substantially the same as the melting point of the resin or slightly lower than the melting point of the resin. In such a case, it may be possible to prevent the composite material 1 from being out of shape when conveyed from the preheating device to the heating die 30.

Further, the method of conveying the composite material 1 from the preheating device to the heating die 30 is not particularly limited. For example, the rails 51 may be extended to the preheating device, and the composite material 1 may be conveyed from the preheating device to the heating die 30 by using the extended rails 51. When the rails 51 are used, the composite material 1 is clamped by the pair of pallets 20 in the preheating device, and the composite material 1 clamped by the pair of pallets 20 is conveyed. Further, for example, rails connecting the preheating device to the heating die 30 may be provided separately from the rails 51, and the composite material 1 may be conveyed from the preheating device to the heating die 30 by using these separate rails. Further, a robot that conveys the composite material 1 from the preheating device to the heating die 30 may be provided. When the composite material 1 is conveyed by the rails separate from the rails 51 or when the composite material 1 is conveyed by the robot, the pair of pallets 20 are set in the heating die 30 and stand by in this state.

Further, although the case where the molded component 2 whose sectional shape when taken along a plane orthogonal to the X-axis direction is a hat shape is manufactured by the processing apparatus 10 has been described in the above embodiments, the present disclosure is not limited thereto. For example, when a molded component whose sectional shape when taken along the plane orthogonal to the X-axis direction is a C-shape, an L-shape, or a Z-shape is manufactured, the processing apparatus 10 and the processing method according to the present disclosure may be used. Further, when a planar molded component is manufactured, the processing apparatus 10 and the processing method according to the present disclosure may be used. In these cases, the pressing surfaces of the heating die and the cooling die have shapes corresponding to the shape of the molded component. Further, the die contact surface and the composite material contact surface of the pallet have shapes corresponding to the shape of the molded component.

Further, for example, when a molded component curved or bent along the X-axis direction is manufactured, the processing apparatus 10 and the processing method according to the present disclosure may be used. Further, when a large molded component whose full length is several meters is manufactured, the processing apparatus 10 and the processing method according to the present disclosure may be used. Further, when a molded component whose plate thickness is 5 mm or greater is manufactured, the processing apparatus 10 and the processing method according to the present disclosure may be used. Further, when a composite material base material in which all the fiber directions (directions in which fibers extend) are the same is molded, the processing apparatus 10 and the processing method according to the present disclosure may be used. Further, when a molded component whose plate thickness varies along the X-axis direction or the Y-axis direction is manufactured, the processing apparatus 10 and the processing method according to the present disclosure may be used. In these cases, the molded component can be manufactured by forming the die contact surfaces 21a, 22a and the composite material contact surfaces 21b, 22b of the pallet 20 into shapes corresponding to the shape of the molded component even without forming the pressing surfaces 31a, 32a of the heating die 30 and the pressing surfaces 41a, 42a of the cooling die 40 into shapes corresponding to the shape of the molded component.

Further, although the case where a single heating die 30 and a single cooling die 40 are provided has been described in the above embodiment, the present disclosure is not limited thereto. For example, multiple heating dies 30 and multiple cooling dies 40 may be provided.

Figure 10:
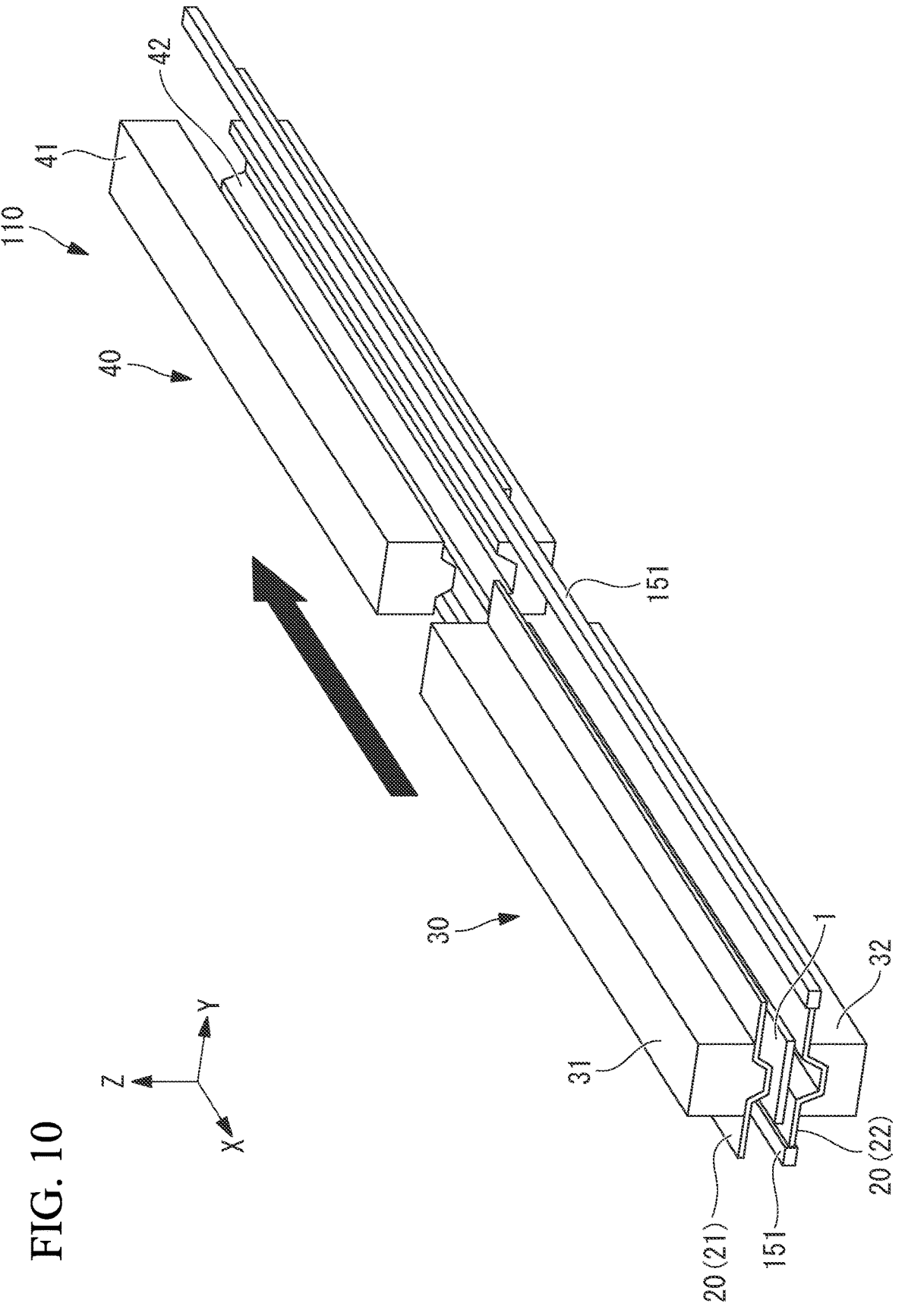
FIG. 10 is a perspective view illustrating a processing apparatus according to a modified example of the present disclosure.

Further, although the example in which the heating die 30 and the cooling die 40 are aligned in the Y-axis direction has been described in the above embodiment, the present disclosure is not limited thereto. For example, as with the processing apparatus 110 illustrated in FIG. 10, the heating die 30 and the cooling die 40 may be aligned in the X-axis direction. In such a case, the pair of rails 151 are arranged so as to extend in the X-axis direction to connect the heating die 30 and the cooling die 40 to each other.

The processing apparatus for a composite material and the processing method for a composite material described in the above embodiment are recognized as follows, for example.

The processing apparatus for a composite material according to one aspect of the present disclosure is a processing apparatus (10) for a composite material (1) in which fibers and a thermoplastic resin are compounded, and the processing apparatus includes: a pair of pallets (20) configured to clamp the composite material; a heating die (30) configured to press and heat the composite material via the pair of pallets; a cooling die (40) configured to press and cool the composite material via the pair of pallets; a temperature adjustment unit (45) configured to adjust a temperature of the cooling die; and a conveyance unit (50) configured to convey the pair of pallets clamping the composite material from the heating die to the cooling die.

The resin contained in the composite material is heated by the heating die and thereby melted. In the above configuration, the pair of pallets that clamp the composite material are provided, and the composite material is pressed and heated by the heating die via the pair of pallets. Accordingly, the composite material does not come into direct contact with the heating die. Therefore, when the composite material is detached from the heating die, the melted resin is not attached to the surface of the heating die. It is thus possible that a situation where the melted resin attaches to the heating die and thereby the composite material becomes out of shape is less likely to occur.

Further, as described above, since the resin contained in the composite material is heated by the heating die and thereby melted, it is difficult to convey only the composite material heated by the heating die. The above configuration includes the conveyance unit that conveys the pair of pallets clamping the composite material from the heating die to the cooling die. In such a way, by conveying the composite material in a state of being clamped by the pair of pallets, it is possible to easily convey the composite material from the heating die to the cooling die without the composite material being out of shape.

Further, by having the conveyance device that easily conveys the composite material to the heating die and the cooling die, the heating die and the cooling die can be separate dies. Because the heating die and the cooling die are separate dies, in a state where no composite material is set, it is possible to reliably maintain the cooling die at a desired temperature while reducing an uneven distribution of the temperature depending on the position by using the temperature adjustment unit. Accordingly, it is possible to convey the composite material to the cooling die in a state where the entire cooling die is maintained substantially evenly at a predetermined temperature. It is therefore possible to reduce an uneven distribution of the temperature when cooling the composite material. Thus, the pressing force working on the composite material can be evenly distributed. Thus, since occurrence of a void or the like can be decreased, the quality of the molded component after processed can be improved.

Further, since the heating die and the cooling die can be separated dies, the step of deforming the composite material 1 and the step of cooling the composite material 1 can be separate steps. Accordingly, it is possible to cool the composite material in the cooling step after adequately deforming the composite material into a desired shape and while maintaining a state where the resin is sufficiently impregnated. It is therefore possible to prevent the composite material 1 from being solidified in an incomplete state in the step of deforming the composite material. It is thus possible to improve the quality of the molded component after processed.

Further, since the composite material is clamped by the pallets when conveyed from the heating die to the cooling die, it may be possible to prevent the composite material from being cooled by the atmospheric air. This can improve the quality of the molded component after processed. Further, it is not necessary to have a facility for preventing the composite material from being cooled during conveyance (for example, a facility for thermally insulating the conveying path). Also, high-speed conveyance of the composite material is not necessary. Thus, capability requirements for the facility can be relaxed. It is therefore possible to simplify the facility and reduce the cost.

Further, in the above configuration, the heating die and the cooling die press the composite material via the pair of pallets. Accordingly, it is possible to deform the composite material into various shapes by changing the shape of the pallets. It is therefore possible to mold the composite material into various shapes by using a single set of the heating die and the cooling die. Thus, cost can be reduced compared to a case where different sets of dies are used for molding various shapes of the composite material.

Further, the processing apparatus for a composite material according to one aspect of the present disclosure includes a restriction part (24) configured to restrict relative movement between the pair of pallets.

The above configuration includes the restriction part that restricts relative movement between the pair of pallets. Accordingly, relative movement between the pair of pallets can be restricted by the restriction part during conveyance from the heating die to the cooling die or the like. Accordingly, it is possible that the composite material is less likely to be out of shape.

Further, in the processing apparatus for a composite material according to one aspect of the present disclosure, the cooling die includes a first contact part (R1) with which a first region of the composite material comes into contact via the pallet and a second contact part (R2, R3, R4) with which a second region of the composite material comes into contact via the pallet, and the temperature adjustment unit adjusts temperatures of the first contact part and the second contact part in accordance with respective shapes of the first and second regions of the composite material with which the first and second contact parts come into contact.

In respective regions of the composite material, the rate of progress of solidification differs in accordance with the shape of the region. For example, if the regions are cooled at the same temperature, a thicker region requires relatively a longer time for heat transfer in the plate thickness direction inside the composite material. Thus, the rate of progress of solidification is slower in the thicker region than in the thinner region. Further, the rate of progress of solidification changes in respective regions of the composite material in accordance with the temperature of the cooling die in contact. In detail, if regions of the same shape are cooled, the rate of progress of solidification is slower in a region of a high temperature of the cooling die in contact than in a region of a low temperature of the cooling die in contact.

In the above configuration, the temperature adjustment unit adjusts respective temperatures of the first contact part and the second contact part in accordance with the shapes of the regions of the composite material with which respective contact parts come into contact. Accordingly, the solidification progress of each region of the composite material can be adjusted to solidification progress in accordance with the shape of the region. Therefore, since the solidification progress can be made even over respective regions, the pressing force working on the composite material can be evenly distributed. Thus, since occurrence of a void or the like can be decreased, the quality of the molded component after processed can be improved.

Note that the shape of the composite material may be the thickness of the composite material, for example. Thus, the temperature adjustment unit may adjust the temperatures of the first contact part and the second contact part in accordance with the thicknesses of the first region and the second region, respectively. In detail, for example, when the thickness of the first region is larger than the thickness of the second region, the temperature of the first contact part may be lower than the temperature of the second contact part.

Further, in the processing apparatus for a composite material according to one aspect of the present disclosure, the cooling die includes a first contact part (R1) with which a first region of the composite material comes into contact via the pallet and a second contact part (R2, R3, R4) with which a second region of the composite material comes into contact via the pallet, and the temperature adjustment unit adjusts temperatures of the first contact part and the second contact part in accordance with respective positions of the first and second regions of the composite material with which the first and second contact parts come into contact.

Further, in respective regions of the composite material, the rate of progress of solidification differs in accordance with the position of the region. For example, if all the temperatures of respective regions of the cooling die are the same, since a region located at the end of the composite material is easily cooled by the ambient air, the rate of progress of solidification is higher in this region than in a region located at the center. Further, for respective regions of the composite material, the rate of progress of solidification varies in accordance with the temperature of the cooling die in contact, as described above.

In the above configuration, the temperature adjustment unit adjusts the temperatures of the first contact part and the second contact part in accordance with the position of the regions of the composite material with which respective contact parts come into contact. Accordingly, the solidification progress of each region of the composite material can be adjusted to solidification progress in accordance with the position of the region. Therefore, since the solidification progress can be made even over respective regions, the pressing force working on the composite material can be evenly distributed. Thus, since occurrence of a void or the like can be decreased, the quality of the molded component after processed can be improved.

Further, the processing method for a composite material according to one aspect of the present disclosure is a processing method for a composite material (1) in which fibers and a thermoplastic resin are compounded, and the processing method includes: a heating step of pressing and heating the composite material by a heating die (30) via a pair of pallets (20) clamping the composite material; a cooling step of pressing and cooling the composite material by a cooling die (40) having a temperature adjustment unit (45) via the pair of pallets; and a conveyance step of conveying the pair of pallets clamping the composite material from the heating die to the cooling die.

LIST OF REFERENCES

1: composite material
2: molded component
2a: flange part
2b: web part

2c: cap part
10: processing apparatus
20: pallet
21: first pallet
21a: die contact surface
21b: composite material contact surface
22: second pallet
22a: die contact surface
22b: composite material contact surface
24: bracket (restriction part)
30: heating die
31: first heating die
31a: pressing surface
32: second heating die
32a: pressing surface
33: heating die heater
40: cooling die
41: first cooling die
41a: pressing surface
42: second cooling die
42a: pressing surface
43: cooling die heater
44: cooling medium pipe
45: temperature adjustment unit
50: conveyance device (conveyance unit)
51: rail

What is claimed is:

1. A processing method for a composite material in which fibers and a thermoplastic resin are compounded, the processing method comprising:

pressing and heating the composite material by a heating die via a first pallet and a second pallet clamping the composite material;

pressing and cooling the composite material by a cooling die having a temperature adjustment unit via the first pallet and the second pallet; and conveying the first pallet and the second pallet clamping the composite material from the heating die to the cooling die, wherein the cooling die includes a first contact part with which a first region of the composite material comes into contact via the first pallet and a second contact part with which a second region of the composite material comes into contact via the first pallet, the first region and the second region are different regions from each other on one surface side of the composite material, the temperature adjustment unit is configured to adjust temperatures of the first contact part and the second contact part in accordance with shapes or positions of the first and second regions of the composite material with which the first and second contact parts come into contact, respectively, and the processing method further comprises setting a temperature of the first contact part lower than a temperature of the second contact part using the temperature adjustment unit, wherein the composite material in the first region has a plate thickness greater than a plate thickness in the second region; or setting a temperature of the second contact part higher than a temperature of the first contact part using the temperature adjustment unit, wherein the second region is positioned closer to an end of the composite material than the first region.

* * * * *